United States Patent
Akiyama et al.

(10) Patent No.: US 10,365,437 B2
(45) Date of Patent: Jul. 30, 2019

(54) FUSION SPLICER

(71) Applicant: FURUKAWA ELECTRIC CO., LTD., Tokyo (JP)

(72) Inventors: Tomohiro Akiyama, Tokyo (JP); Hisanori Yonenaga, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 349 days.

(21) Appl. No.: 15/424,354

(22) Filed: Feb. 3, 2017

(65) Prior Publication Data

US 2017/0235053 A1 Aug. 17, 2017

(30) Foreign Application Priority Data

Feb. 12, 2016 (JP) .................. 2016-025261

(51) Int. Cl.
*B23K 10/00* (2006.01)
*G02B 6/255* (2006.01)
*H05H 1/36* (2006.01)

(52) U.S. Cl.
CPC ......... *G02B 6/2553* (2013.01); *G02B 6/2555* (2013.01); *H05H 1/36* (2013.01)

(58) Field of Classification Search
CPC ...... H05H 1/36; B23K 10/006; G05B 6/2555; G05B 6/2553
USPC ............. 219/121.45, 121.59, 121.39, 121.54
See application file for complete search history.

(56) References Cited

U.S. PATENT DOCUMENTS

| 7,494,288 | B2 * | 2/2009 | Ozawa | G02B 6/2551 |
| | | | | 385/96 |
| 2007/0193983 | A1 * | 8/2007 | Wiley | G02B 6/2551 |
| | | | | 219/121.59 |
| 2010/0065535 | A1 * | 3/2010 | Zheng | H05B 7/00 |
| | | | | 219/121.38 |

FOREIGN PATENT DOCUMENTS

JP 2000-28846 1/2000

* cited by examiner

*Primary Examiner* — Mark H Paschall
(74) *Attorney, Agent, or Firm* — Oblon, McClelland, Maier & Neustadt, L.L.P.

(57) ABSTRACT

A fusion splicer includes: a first gear including a first eccentric cam unit; a first rotating member including a first main body having a first abutting surface abutting on the first eccentric cam unit, a first arm unit extending from the first main body and rotatably supported by a main base, and a second arm unit extending from the first main body; a second gear including a second eccentric cam unit; and a second rotating member including a second main body having a second abutting surface abutting on the second eccentric cam unit, a third arm unit extending from the second main body and rotatably supported by the second arm unit, a fourth arm unit extending from the second main body, and a placing unit at a tip end of the fourth arm unit with a groove for receiving one of optical fibers.

5 Claims, 9 Drawing Sheets

FUSION SPLICER

CROSS-REFERENCE TO RELATED APPLICATIONS

The present application claims priority to and incorporates by reference the entire contents of Japanese Patent Application No. 2016-025261 filed in Japan on Feb. 12, 2016.

BACKGROUND

The present disclosure relates to a fusion splicer.

In the related art, a fusion splicer has been used for fusion splicing two optical fibers. In a general fusion splicer, coating on the tip ends of two optical fibers is removed, the tip ends are arranged facing each other, and the tip ends of the two optical fibers are fusion spliced by using arc discharge.

In fusion splicing the tip ends of two optical fibers, relative positions of the two optical fibers are aligned so that the center axes of the optical fibers match with each other, before the arc discharge. Japanese Laid-open Patent Publication No. 2000-28846 discloses a device that includes an electric motor being a rotating electric motor and a lever arm, and that aligns optical fibers by moving movable stages on which the optical fibers are placed, using the electric motor and the lever arm, as well as a fusion splicer using the same. In the fusion splicer disclosed in Japanese Laid-open Patent Publication No. 2000-28846, the movable stages are moved and guided by two linear motion guides in a direction that the movable stages are orthogonal with each other.

There are various types of optical fibers with different thickness. To implement a fusion splicer capable of fusion splicing the various types of optical fibers, it is preferable that the fusion splicer has high flexibility in designing the moving amount of the optical fibers when the optical fibers are to be aligned, and the like.

There is a need for a fusion splicer having high flexibility in designing.

SUMMARY

According to one aspect of the present disclosure, a fusion splicer for fusion-splicing tip ends of two optical fibers that are arranged facing each other includes: a first rotating electric motor; a first gear that includes a first eccentric cam unit and rotates when driven to rotate by the first rotating electric motor; a first rotating member that includes: a first main body unit having a first abutting surface abutting on the first eccentric cam unit; a first arm unit that is provided so as to extend from the first main body unit and is rotatably supported by a main base of the fusion splicer, around an axis in parallel with a rotational axis of the first gear; and a second arm unit that is provided so as to extend from the first main body unit toward a direction different from that of the first arm unit; a second rotating electric motor; a second gear that includes a second eccentric cam unit and rotates when driven to rotate by the second rotating electric motor; and a second rotating member that includes: a second main body unit having a second abutting surface abutting on the second eccentric cam unit; a third arm unit that is provided so as to extend from the second main body unit and that is rotatably supported by the second arm unit around an axis in parallel with a rotational axis of the second gear as well as a rotational axis of the second arm unit; a fourth arm unit that is provided so as to extend from the second main body unit toward a direction different from that of the third arm unit; and a placing unit that is provided at a tip end of the fourth arm unit and on which a groove for receiving one of the optical fibers is formed.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

In the following, a preferred embodiment of a fusion splicer according to the present disclosure will be described in detail with reference to the accompanying drawings. It is to be understood that the present disclosure is not limited to the embodiment. In the drawings, the same reference numerals denote the same or corresponding elements.

Embodiment

Figure 1:
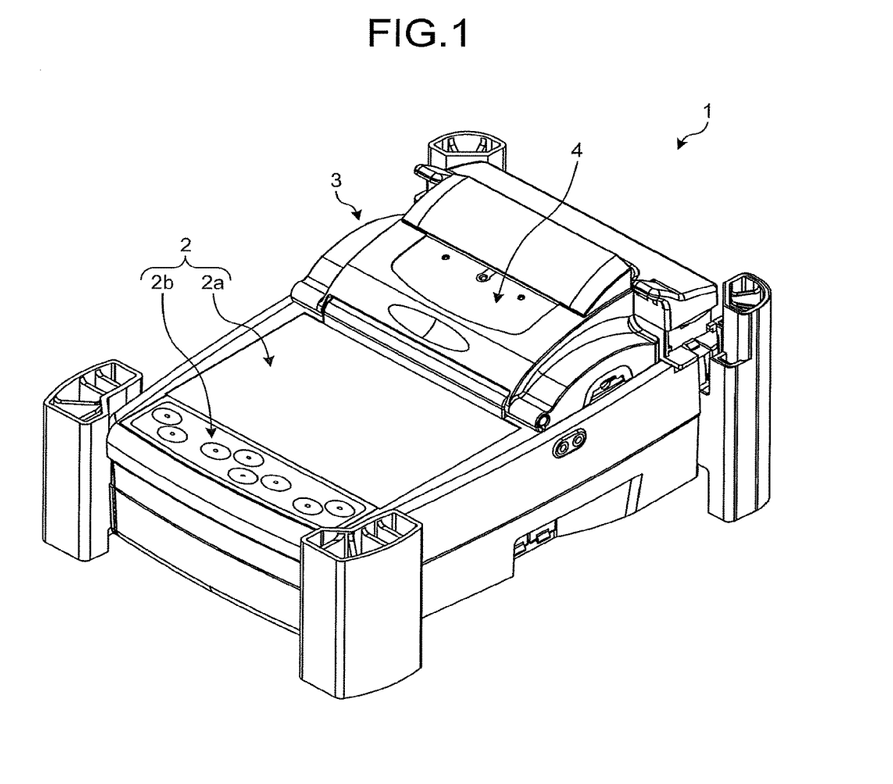
FIG. 1 is a schematic perspective view of a fusion splicer according to an embodiment.

FIG. 1 is a schematic perspective view of a fusion splicer that includes a heating device according to an embodiment. A fusion splicer 1 includes a display operation unit 2, an electric discharge unit 3, and a windshield cover 4.

The display operation unit 2 includes a display unit 2a and an input unit 2b. For example, the display unit 2a includes a liquid crystal panel that displays a setting value of a splice loss between optical fibers, a warning relating to an error, and the like. The input unit 2b includes various operation keys for turning ON/OFF a power source of the fusion splicer 1, turning ON/OFF the heating device, and the like.

The electric discharge unit 3 is a portion in which the tip ends of two optical fibers to be connected are arranged facing each other, and that fusion-splices the tip ends of the two optical fibers by using arc discharge. The electric discharge unit 3 is covered by the windshield cover 4, and during the fusion-splicing, the electric discharge unit 3 performs fusion-splicing with the windshield cover 4 closed.

Figure 2:
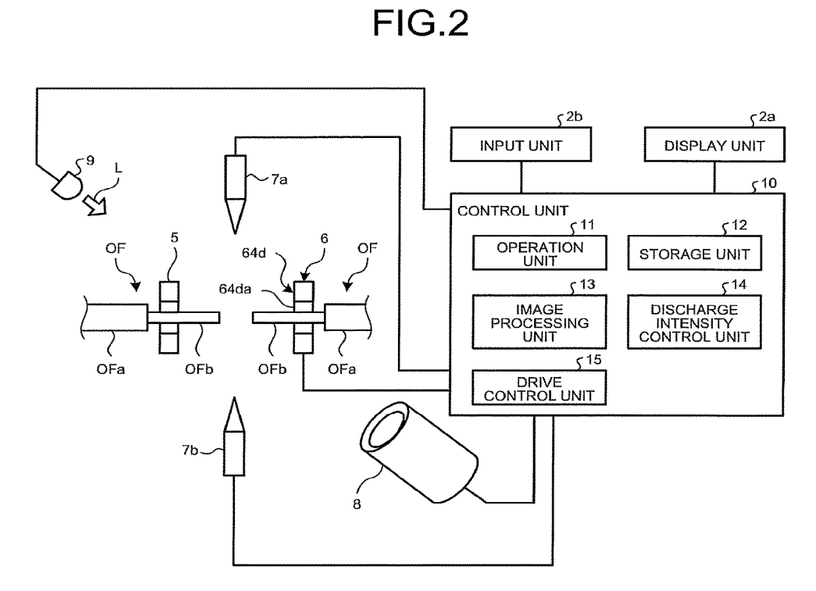
FIG. 2 is a block diagram of a structure of the fusion splicer illustrated in FIG. 1 when fusion-splicing is to be controlled.

FIG. 2 is a block diagram of a structure of the fusion splicer 1 when fusion-splicing is to be controlled. The fusion splicer 1 includes a fixed placing unit 5 and an optical fiber moving mechanism 6, on which one of two optical fiber core wires OF is placed and a V-shaped groove is formed, respectively. A coating removed portion OFb that is a portion of each of the optical fiber core wires OF where coating OFa is removed from the tip end and a glass optical fiber is exposed, is placed on the fixed placing unit 5 and the optical fiber moving mechanism 6. In addition, the position of each of the optical fiber core wires OF is fixed to the fixed placing unit 5 as well as the optical fiber moving mechanism 6, by being pressed by a clamp, which is not illustrated. Each of the optical fiber core wires OF is held in a holder, which is not illustrated. The holder is driven by an electric motor such that the optical fiber core wires OF move forward and backward in the longitudinal direction.

During the fusion-splicing, the holders move such that the two optical fiber core wires OF move toward each other, and the end facets of the two optical fiber core wires OF are brought close to each other to a predetermined distance. Then, the optical fiber moving mechanism 6 moves the optical fiber core wires OF being placed thereon, in the direction perpendicular to the longitudinal direction of the optical fiber core wires OF, or in the direction orthogonal with each other, using a first electric motor and a second electric motor, which will be described below. Consequently, the two optical fiber core wires OF are aligned with each other, and the end facets of the two optical fiber core wires OF are abutting on each other at the predetermined position. In this state, arc discharge is performed by electrodes 7a and 7b that are arranged facing each other in the direction perpendicular to the longitudinal direction of the two optical fiber core wires OF, and the two optical fiber core wires OF are heated and melted, whereby the two optical fiber core wires OF are fusion spliced.

A light receiving system 8 and a light source 9 are arranged interposing the two optical fiber core wires OF and a plane on which and the electrodes 7a and 7b are arranged. There are two sets of the light receiving system 8 and the light source 9. The two sets of the light receiving system 8 and the light source 9 are arranged such that the optical axes of the two sets of the light receiving system 8 and the light source 9 are in a direction perpendicular to each other. In FIG. 2, to simplify the explanation, only a set of the light receiving system 8 and the light source 9 is illustrated. The light receiving system 8 is an optical system including an imaging device such as a charge-coupled device (CCD). The imaging device takes an image of the two optical fiber core wires OF that are projected by light L output from the light source 9. In other words, the fusion splicer 1 has a structure of what is called two-axis observation.

The optical fiber moving mechanism 6, the electrodes 7a and 7b, the light receiving system 8, the light source 9, the display unit 2a, and the input unit 2b are connected to a control unit 10, and the control unit 10 controls the operations of the units. The control unit 10 is a microcomputer and the like, for example, and includes an operation unit 11, a storage unit 12, an image processing unit 13, a discharge intensity control unit 14, and a drive control unit 15.

The operation unit 11 performs various operation processes so as to enable the control unit 10 to control the operations. The storage unit 12 includes a storage unit such as a read-only memory (ROM) and a storage unit such as a random-access memory (RAM). The ROM stores therein various programs, data, and the like that are used when the operation unit 11 performs an operation process. The RAM is used as a work space for the operation unit 11 during the operation process, for storing results of the operation process performed by the operation unit 11, and the like.

The image processing unit 13 performs imaging process on images of the optical fiber core wires OF that are taken by the two light receiving systems. The processing result by the image processing unit 13 is used for controlling the operation of bringing the end facets of the two optical fiber core wires OF close to each other to a predetermined distance, the alignment of the axes, and the discharge intensity. The discharge intensity control unit 14 controls the intensity of the arc discharge from the electrodes 7a and 7b. The drive control unit 15 drives and controls the electric motors described above, so as to bring the end facets of the two optical fiber core wires OF close to each other to a predetermined distance, as well as to align the two optical fiber core wires OF by the optical fiber moving mechanism 6.

Figure 3:
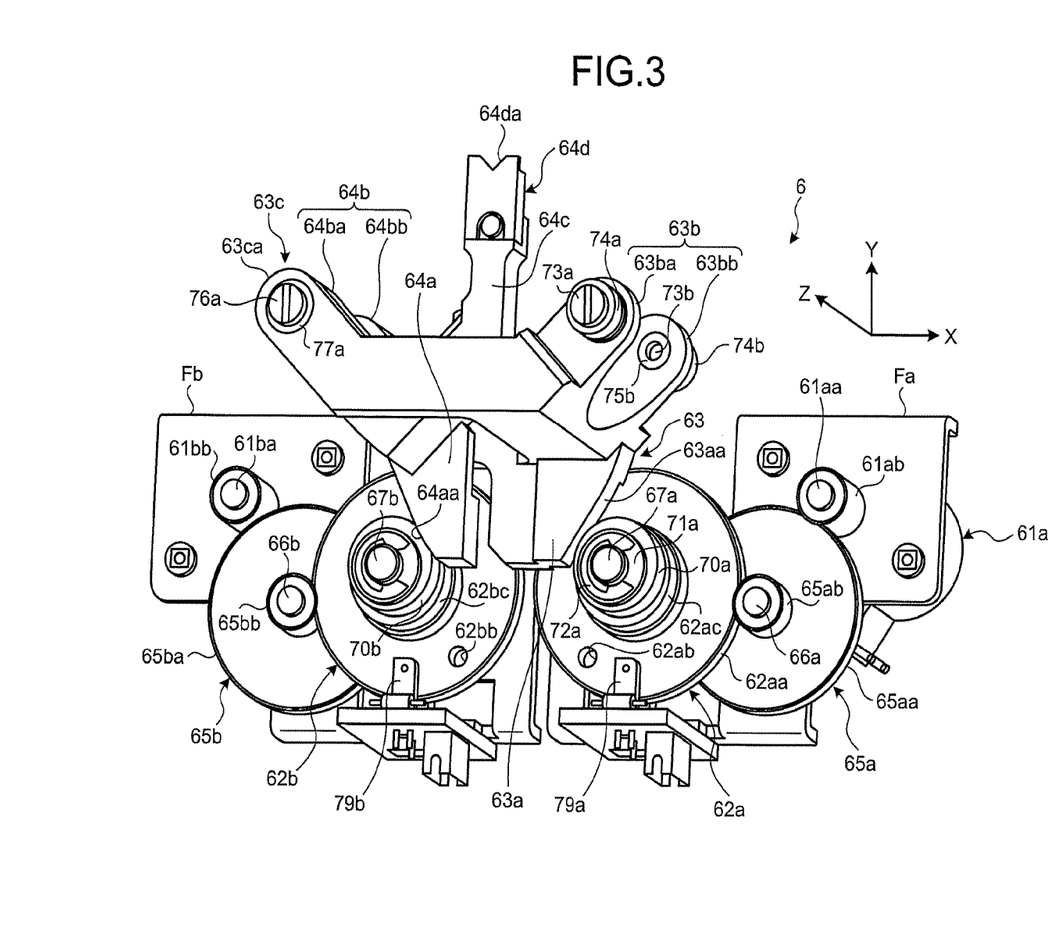
FIG. 3 is a schematic perspective view of an optical fiber moving mechanism.
Figure 4:
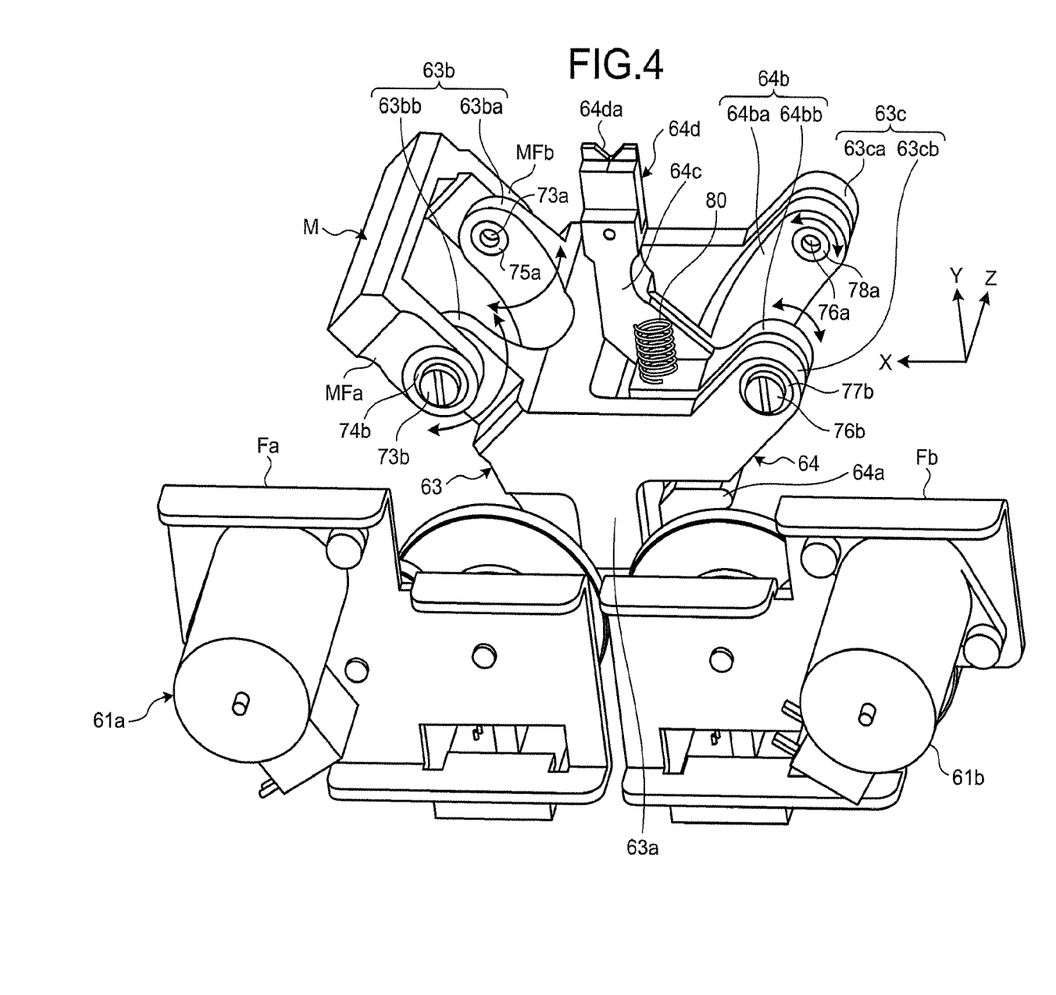
FIG. 4 is a schematic perspective view of the optical fiber moving mechanism.
Figure 5:
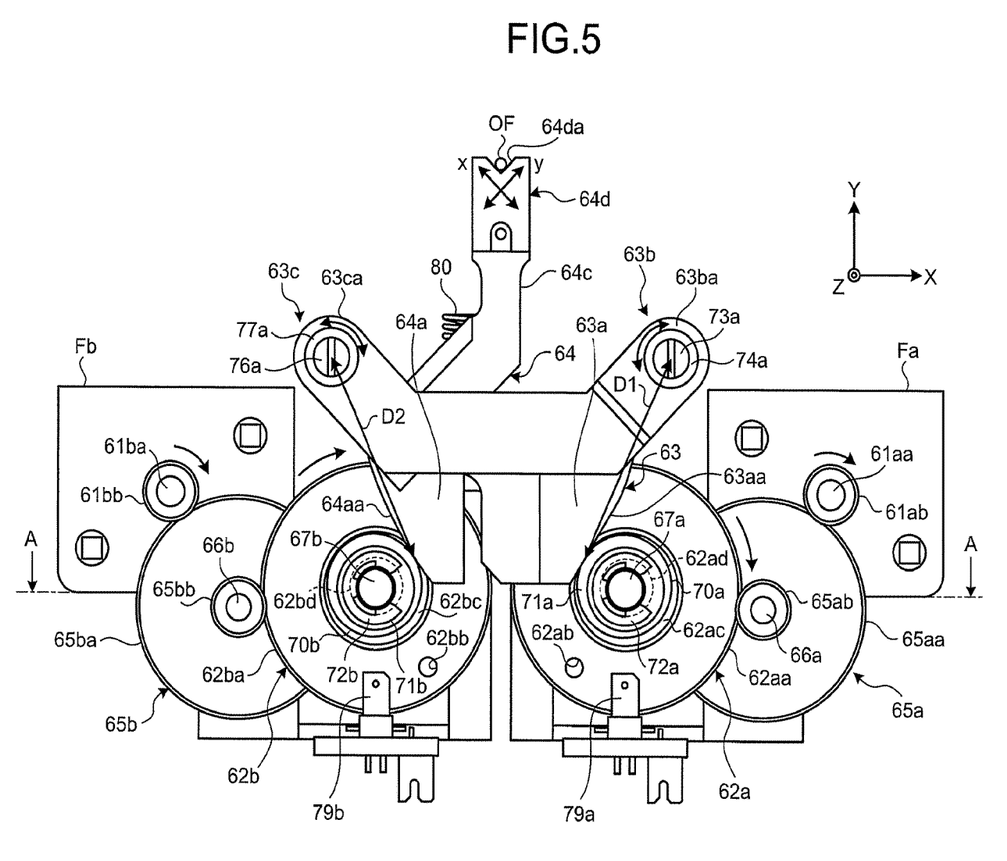
FIG. 5 is a schematic front view of the optical fiber moving mechanism.
Figure 6:
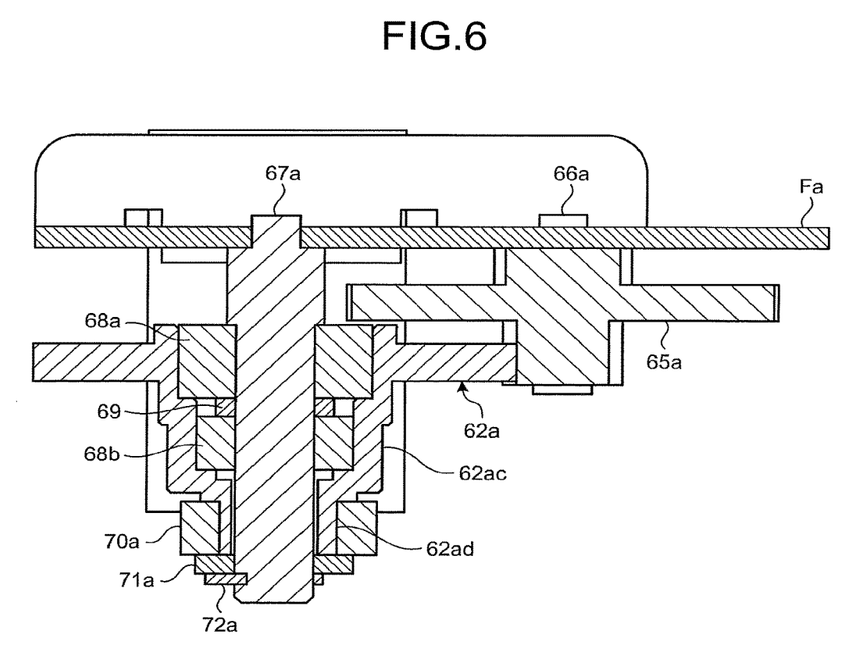
FIG. 6 is a partial sectional view cut along the line A-A in FIG. 5.
Figure 7:
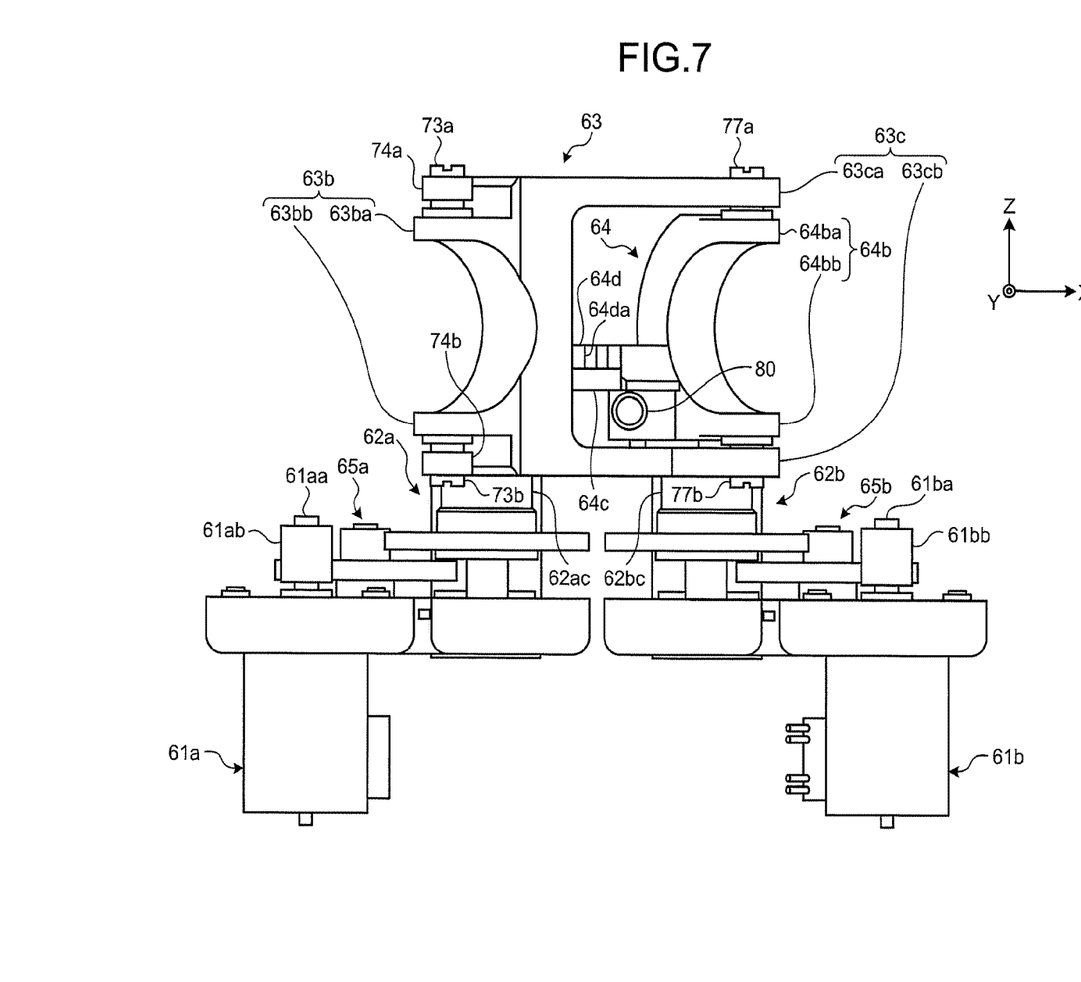
FIG. 7 is a schematic plan view of the optical fiber moving mechanism.
Figure 8:
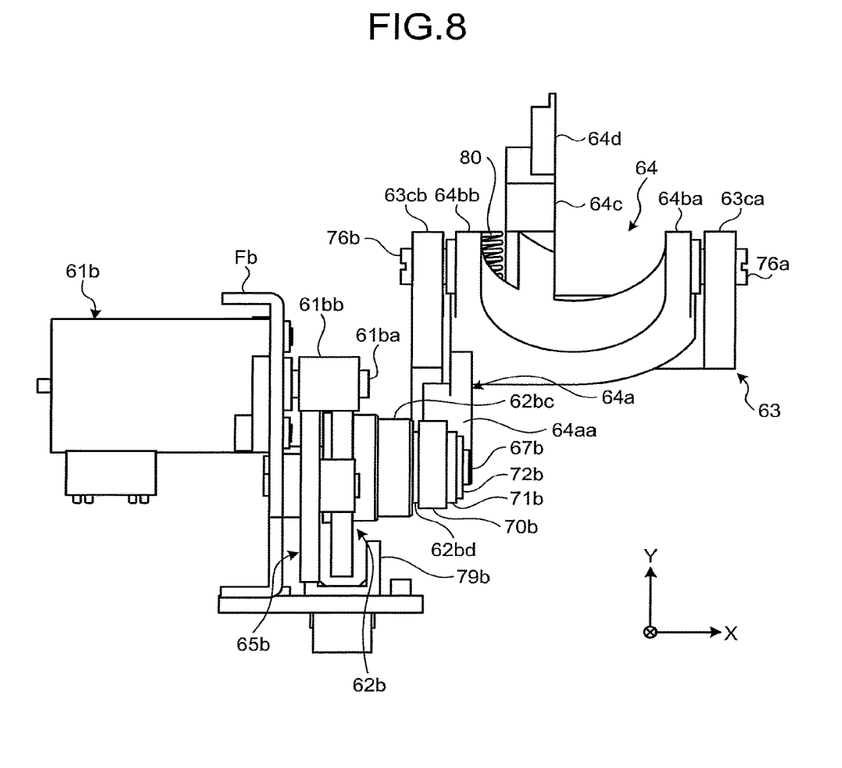
FIG. 8 is a schematic side view of the optical fiber moving mechanism.

Next, the optical fiber moving mechanism 6 will be explained. FIG. 3 and FIG. 4 are schematic perspective views of the optical fiber moving mechanism 6. FIG. 5 is a schematic front view of the optical fiber moving mechanism 6. FIG. 6 is a partial sectional view cut along the line A-A in FIG. 5. FIG. 7 is a schematic plan view of the optical fiber moving mechanism 6. FIG. 8 is a schematic side view of the optical fiber moving mechanism 6. An XYZ coordinate system that is three axes (X-axis, Y-axis, and Z-axis) orthogonal coordinate system is used to describe the directions in the drawings.

Structure of Optical Fiber Moving Mechanism

First, a structure of the optical fiber moving mechanism 6 will be explained. The optical fiber moving mechanism 6 includes a first electric motor 61a being a first rotating electric motor, a first gear 62a, a first rotating member 63, a second electric motor 61b being a second rotating electric motor, a second gear 62b, a second rotating member 64, and speed reduction gears 65a and 65b.

The first electric motor 61a being a pulse motor is supported by a first frame Fa. The first electric motor 61a is an electric motor with a speed reducer, and an output gear 61ab is attached to an output shaft 61aa of the first electric motor 61a. The first electric motor 61a is driven to rotate by the control unit 10.

The speed reduction gear 65a is made of engineering plastics, for example, fixed to the first frame Fa, and is rotatably supported by a shaft 66a that extends in the Z direction. The speed reduction gear 65a is a two-staged gear, and includes a large diameter gear 65aa and a small diameter gear 65ab. The large diameter gear 65aa is meshed with the output gear 61ab of the first electric motor 61a.

The first gear 62a is a sintered gear, for example, and an outer circumferential teeth 62aa are formed on the outer periphery. The outer circumferential teeth 62aa are meshed with the small diameter gear 65ab of the speed reduction gear 65a. Consequently, when the first gear 62a is driven to rotate by the first electric motor 61a, the driving force is transmitted to the first gear 62a via the speed reduction gear 65a, thereby rotating the first gear 62a. In addition, a hole 62ab for detecting the rotation position is provided on the first gear 62a.

As illustrated in FIG. 6, the first gear 62a is fixed to the first frame Fa, and is rotatably supported by a first shaft 67a that extends in the Z direction, via bearings 68a and 68b. The bearings 68a and 68b are separated from each other interposing an annular collar 69 therebetween. The first gear 62a includes a two-staged cylindrical projection unit 62ac through which the first shaft 67a penetrates, and a cylindrical first eccentric cam unit 62ad that is provided on the projection unit 62ac and through which the first shaft 67a penetrates. The center axis of the projection unit 62ac is formed so as to be coaxial with the center axis of the first shaft 67a. The center axis of the first eccentric cam unit 62ad is formed so as to be eccentric to the center axis of the first shaft 67a. A bearing 70a is fitted to the first eccentric cam unit 62ad. A washer 71a and a retaining ring 72a are provided on the first shaft 67a, so as to prevent the first gear 62a from falling off from the first shaft 67a.

The first gear 62a, the projection unit 62ac, and the first eccentric cam unit 62ad are integrally formed of the same material.

Similarly, the second electric motor 61b being a pulse motor is supported by a second frame Fb. The second electric motor 61b is an electric motor with a speed reducer, and an output gear 61bb is attached to an output shaft 61ba of the second electric motor 61b. The second electric motor 61b is driven to rotate by the control unit 10.

The speed reduction gear 65b is made of engineering plastics, for example, fixed to the second frame Fb, and is rotatably supported by a shaft 66b that extends in the Z direction. The speed reduction gear 65b is a two-staged gear, and includes a large diameter gear 65ba and a small diameter gear 65bb. The large diameter gear 65ba is meshed with the output gear 61bb of the second electric motor 61b.

The second gear 62b is a sintered gear, for example, and an outer circumferential teeth 62ba are formed on the outer periphery. The outer circumferential teeth 62ba are meshed with the small diameter gear 65bb of the speed reduction gear 65b. Consequently, when the second gear 62b is driven to rotate by the second electric motor 61b, the driving force is transmitted to the second gear 62b via the speed reduction gear 65b, thereby rotating the second gear 62b. A hole 62bb for detecting the rotation position is provided on the second gear 62b.

Similar to the first gear 62a, the second gear 62b is fixed to the second frame Fb, and is rotatably supported by a second shaft 67b that extends in the Z direction, via two bearings. The two bearings are separated from each other interposing an annular collar therebetween. The second gear 62b includes a two-staged cylindrical projection unit 62bc through which the second shaft 67b penetrates, and a cylindrical second eccentric cam unit 62bd that is provided on the projection unit 62bc and through which the second shaft 67b penetrates (see FIG. 5 and FIG. 8). The center axis of the projection unit 62bc is formed so as to be coaxial with the center axis of the second shaft 67b. The center axis of the second eccentric cam unit 62bd is formed so as to be eccentric to the center axis of the second shaft 67b. A bearing 70b is fitted to the second eccentric cam unit 62bd. In addition, a washer 71b and a retaining ring 72b are provided on the second shaft 67b, so as to prevent the second gear 62b from falling off from the second shaft 67b.

The second gear 62b, the projection unit 62bc, and the second eccentric cam unit 62bd are integrally formed of the same material.

Figure 9:
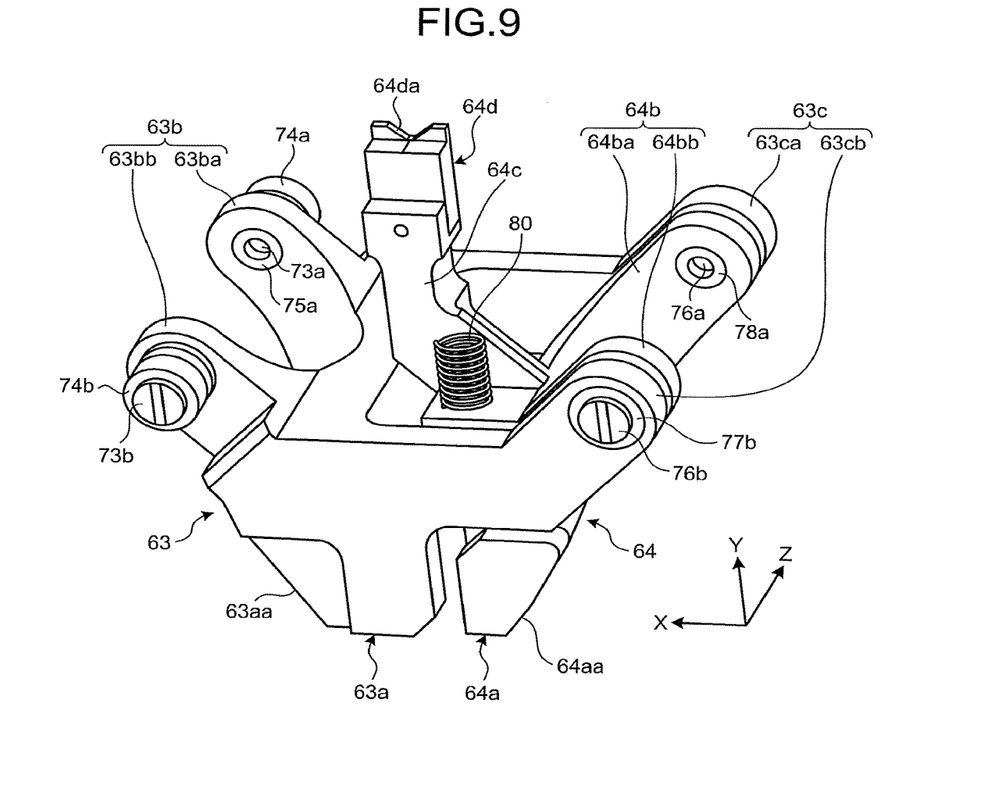
FIG. 9 is a schematic perspective view of a first rotating member and a second rotating member.

The first rotating member 63 will now be described. FIG. 9 is a schematic perspective view of the first rotating member 63 and the second rotating member 64. The first rotating member 63 is made of die-cast aluminum, for example, and includes a first main body unit 63a, a first arm unit 63b, and a second arm unit 63c. The first main body unit 63a includes a first abutting surface 63aa having a substantially planar surface that is abutting on the first eccentric cam unit 62ad via the bearing 70a. The first abutting surface 63aa is substantially in parallel with the Z-axis, and is in non-parallel with the X-axis and the Y-axis.

The first arm unit 63b includes a pair of arms 63ba and 63bb that are provided so as to extend from the first main body unit 63a and that extend in parallel with each other. The arms 63ba and 63bb extend substantially in parallel with the X-Y plane. The arms 63ba and 63bb also extend so as to incline toward the positive direction of the X-axis from the Y-axis. Furthermore, as illustrated in FIG. 4, the arms 63ba and 63bb are rotatably and respectively supported by fixed arms MFa and MFb that are provided on a main base M, around an axis in parallel with the rotational axis of the first gear 62a (in other words, around an axis in parallel with the Z-axis). In other words, the positions of the rotational axes of the arms 63ba and 63bb are fixed. To simplify the diagrams, illustrations of the main base M and the fixed arms MFa and MFb are omitted in FIG. 3 to FIG. 5, and in FIG. 7 to FIG. 9. In this example, the main base M is a base member that is arranged inside the fusion splicer 1, and on which the components of the fusion splicer 1 are attached. In FIG. 4, a part of the main base M is illustrated. For example, the first frame Fa and the second frame Fb are also attached to the main base.

The arms 63ba and 63bb are supported by the main base (fixed arms MFa and MFb) via bearings 74a and 74b that are fitted to shoulder screws 73a and 73b, respectively. The shoulder screws 73a and 73b are respectively screwed into bosses 75a and 75b that are each pressed into a through hole that is formed on each of the arms 63ba and 63bb.

The second arm unit 63c includes a pair of arms 63ca and 63cb that are provided so as to extend from the first main body unit 63a and that extend in parallel with each other. The arms 63ca and 63cb extend substantially in parallel with the X-Y plane. The arms 63ca and 63cb also extend in a direction different from that of the arms 63ba and 63bb of the first arm unit 63b. More specifically, the arms 63ca and 63cb extend so as to incline toward the negative direction of the X-axis from the Y-axis.

Next, the second rotating member 64 will be explained. The second rotating member 64 is made of die-cast aluminum, for example, and includes a second main body unit 64a, a third arm unit 64b, a fourth arm unit 64c, and a placing unit 64d. The second main body unit 64a includes a second abutting surface 64aa having a substantially plane-surface that abuts to the second eccentric cam unit 62bd via the bearing 70b. The second abutting surface 64aa is substantially in parallel with the Z-axis, and is in non-parallel with the X-axis and the Y-axis.

The third arm unit 64b includes a pair of arms 64ba and 64bb that are provided so as to extend from the second main body unit 64a, and that extend in parallel with each other. The arms 64ba and 64bb extend substantially in parallel with the X-Y plane. The arms 64ba and 64bb also extend so as to incline toward the positive direction of the X-axis from the Y-axis. Furthermore, the arms 64ba and 64bb are rotatably and respectively supported by the arms 63ca and 63cb of the second arm unit 63c of the first rotating member 63, around an axis in parallel with the rotational axis of the second gear 62b and the rotational axis of the arms 63ca and 63cb (in other words, around an axis in parallel with the Z-axis). The positions of the rotational axes of the arms 64ba and 64bb are movable.

The arms 64ba and 64bb are supported by the arms 63ca and 63cb, via bearings 77a and 77b that are fitted to shoulder screws 76a and 76b, respectively. The shoulder screws 76a and 76b are screwed into a boss 78a and a boss, which is not illustrated, being pressed into a through hole that is formed on each of the arms 64ba and 64bb.

The fourth arm unit 64c is provided so as to extend from the second main body unit 64a. The fourth arm unit 64c extends in a direction different from that of the arms 64ba and 64bb of the third arm unit 64b. More specifically, the fourth arm unit 64c extends substantially in parallel with the Y-axis as well as in the positive direction of the Y-axis.

The placing unit 64d is made of zirconia, for example, and is provided at the tip end of the fourth arm unit 64c. A V-shaped groove 64da for receiving one of the optical fiber core wires OF is formed on the placing unit 64d (see also FIG. 2).

Furthermore, the optical fiber moving mechanism 6 includes optical sensors 79a and 79b. The optical sensor 79a is arranged so as to interpose the first gear 62a between a built-in laser light source and a photodiode, at a position facing the surface on which the hole 62ab of the first gear 62a is provided. The optical sensor 79b is arranged so as to interpose the second gear 62b between a built-in laser light source and a photodiode, at the position facing the surface on which the hole 62bb of the second gear 62b is provided. The optical sensor 79a emits laser light from the laser light source toward the first gear 62a. In this example, when the hole 62ab comes to the position in front of the optical sensor 79a by the rotation of the first gear 62a, the laser light that is emitted from the optical sensor 79a passes through the hole 62ab, and the optical sensor 79a detects the passed light by the photodiode. When the passed light is detected, the optical sensor 79a outputs an electric signal to the control unit 10. Thus, the control unit 10 may detect the rotation position of the first gear 62a (position in the rotating direction) by the presence of the input electric signal. The optical sensor 79b functions the same as the optical sensor 79a. Consequently, the control unit 10 may detect the rotation position of the second gear 62b.

The rotation angle of the first electric motor 61a is determined by assuming the rotation position of the first electric motor 61a when the optical sensor 79a has detected light as a zero angle position, and finding the amount of pulse signals the control unit 10 has transmitted to the first electric motor 61a from the zero angle position. Thus, the control unit 10 may detect the rotation angle and the rotation position of the first electric motor 61a. The rotation angle and the rotation position of the second electric motor 61b may also be detected in a similar manner.

Furthermore, the optical fiber moving mechanism 6 includes a coil spring 80 that is provided above the second main body unit 64a of the second rotating member 64, and that extends substantially in parallel with the Y-axis. The coil spring 80 is pressed by a pressing member that is provided on the main base M, when the windshield cover 4 is closed, and applies a pressing force to the second rotating member 64, in the negative direction of the Y-axis. Consequently, the second abutting surface 64aa of the second rotating member 64, and the first abutting surface 63aa of the first rotating member 63 are pressed against the bearing 70a that is fitted to the first eccentric cam unit 62ad and the bearing 70b that is fitted to the second eccentric cam unit 62bd, respectively. As a result, it is possible to prevent a gap from being generated between the second rotating member 64 and the first rotating member 63, and the bearings 70a and 70b, thereby securing the abutment.

Operation of Optical Fiber Moving Mechanism

Next, an operation of the optical fiber moving mechanism 6 will now be described mainly with reference to FIGS. 4, 5, and 9.

When the control unit 10 rotates and drives the first electric motor 61a in a clockwise direction when viewed from the positive direction of the Z-axis, the driving force is transmitted to the first gear 62a via the speed reduction gear 65a, thereby rotating the first gear 62a in the clockwise direction. The first eccentric cam unit 62ad is also rotated with the rotation of the first gear 62a. Subsequently, the bearing 70a that is fitted to the first eccentric cam unit 62ad rolls on the first abutting surface 63aa in the first main body unit 63a of the first rotating member 63. In this example, when the first eccentric cam unit 62ad is rotated, distance between the center axis of the first shaft 67a that is the rotational axis of the first eccentric cam unit 62ad, and the outer peripheral surface of the bearing 70a that is abutting on the first abutting surface 63aa changes, according to the positional relation between the center axis of the first eccentric cam unit 62ad and the center axis of the first shaft 67a. Consequently, the first rotating member 63 is swingably rotated around the shoulder screws 73a and 73b. If the initial rotation position of the first eccentric cam unit 62ad is the rotation position where the center axis of the first eccentric cam unit 62ad is furthest away from the abutting position of the bearing 70a and the first abutting surface 63aa, when the first eccentric cam unit 62ad rotates once in the clockwise direction, the first rotating member 63 is swingably rotated in the counterclockwise direction first, and then rotated in the clockwise direction.

Because the second main body unit 64a rotates with the first main body unit 63a, the placing unit 64d also rotates. However, as illustrated in FIG. 5, distance D1 between the rotational axis of the first main body unit 63a, and the abutting position of the bearing 70a and the first abutting surface 63aa is larger than the eccentricity of the first eccentric cam unit 62ad (distance between the center axis of the first eccentric cam unit 62ad and the center axis of the first shaft 67a). Thus, the placing unit 64d moves in the X-axis direction illustrated in FIG. 5, in a substantially straight manner. Consequently, the optical fiber core wire OF that is placed on the V-shaped groove 64da of the placing unit 64d also moves in the X-axis direction that is perpendicular to the longitudinal direction thereof (Z-axis direction), in a substantially straight manner.

Similarly, when the control unit 10 rotates and drives the second electric motor 61b in the clockwise direction when viewed from the positive direction of the Z-axis, driving force is transmitted to the second gear 62b via the speed reduction gear 65b, thereby rotating the second gear 62b in the clockwise direction. The second eccentric cam unit 62bd is also rotated with the rotation of the second gear 62b. Then, the bearing 70b that is fitted to the second eccentric cam unit 62bd rolls on the second abutting surface 64aa in the second main body unit 64a of the second rotating member 64. In this example, when the second eccentric cam unit 62bd is rotated, distance between the center axis of the second shaft 67b that is the rotational axis of the second eccentric cam unit 62bd, and the outer peripheral surface of the bearing 70b that is abutting on the second abutting surface 64aa changes, according to the positional relation between the center axis of the second eccentric cam unit 62bd and the center axis of the second shaft 67b. Consequently, as illustrated in FIG. 4, the second rotating member 64 swingably rotates around the shoulder screws 76a and 76b. If the initial rotation position of the second eccentric cam unit 62bd is the rotation position where the center axis of the second eccentric cam unit 62bd is furthest away from the abutting position of the bearing 70b and the second abutting surface 64aa, when the second eccentric cam unit 62bd rotates once in the clockwise direction, the second rotating member 64 is swingably rotated in the counterclockwise direction first, and then rotated in the clockwise direction.

However, as illustrated in FIG. 5, when distance D2 between the rotational axis of the second rotating member 64, and the abutting position of the bearing 70b and the second abutting surface 64aa, is larger than the eccentricity of the second eccentric cam unit 62bd (distance between the center axis of the second eccentric cam unit 62bd and the center axis of the second shaft 67b), the placing unit 64d moves in the Y-axis direction illustrated in FIG. 5, in a substantially straight manner. Consequently, the optical fiber core wire OF that is placed on the V-shaped groove 64da of the placing unit 64d also moves in the Y-axis direction perpendicular to the longitudinal direction thereof (Z-axis direction), in a substantially straight manner.

In this manner, the optical fiber moving mechanism 6 may move the optical fiber core wires OF being placed in the X-axis direction as well as the Y-axis direction that are perpendicular to the longitudinal direction of the optical fiber core wires OF and that are orthogonal with each other. Thus, the fusion splicer 1 may align the optical fiber core wires OF that are placed on the fixed placing unit 5.

In the fusion splicer 1 according to the present embodiment, the length of an arc that is the track of the movement of the abutting position in association with the rotation of the first rotating member 63 may be adjusted, by adjusting the distance D1 between the rotational axis of the first main body unit 63a, and the abutting position of the bearing 70a and the first abutting surface 63aa. Thus, it is possible to flexibly adjust the movement amount of the placing unit 64d in the X-axis direction, relative to the eccentricity of the first eccentric cam unit 62ad. For example, it is possible to reduce the moving amount of the placing unit 64d in the X-axis direction relative to the eccentricity of the first eccentric cam unit 62ad, by increasing the distance D1. In addition, it is possible to increase the moving amount of the placing unit 64d in the X-axis direction by reducing the distance D1. Similarly, by adjusting the distance D2 between the rotational axis of the second rotating member 64, and the abutting position of the bearing 70b and the second abutting surface 64aa, it is possible to flexibly adjust the moving amount of the placing unit 64d in the Y-axis direction, relative to the eccentricity of the second eccentric cam unit 62bd. In this manner, for example, in the fusion splicer 1 for the optical fiber core wires OF in which the glass optical fiber has a large diameter, it is possible to design the fusion splicer 1 such that the optical fiber core wires OF may be aligned speedily, by reducing the distance D1 and the distance D2, and increasing the moving amount of the placing unit 64d in the X-axis direction as well as the Y-axis direction. In addition, for example, in the fusion splicer 1 for the optical fiber core wires OF in which the glass optical fiber has a small diameter, it is possible to design the fusion splicer 1 such that the optical fiber core wires OF may be aligned more precisely, by increasing the distance D1 and the distance D2, reducing the moving amount of the placing unit 64d in the X-axis direction as well as the Y-axis direction, and allowing a higher resolution movement. In this manner, the fusion splicer 1 according to the present embodiment has high flexibility in designing.

In the fusion splicer 1, the arms 63ba and 63bb of the first arm unit 63b of the first rotating member 63 are supported by the fixed arms MFa and MFb of the main base via the bearings 74a and 74b, respectively. The arms 64ba and 64bb of the third arm unit 64b of the second rotating member 64 are supported by the arms 63ca and 63cb of the second arm unit 63c of the first rotating member 63 via the bearings 77a and 77b, respectively. In this manner, the first rotating member 63 and the second rotating member 64 that perform rotating movement are used for moving the placing unit 64d in the orthogonal direction, and the first rotating member 63 and the second rotating member 64 are supported as the above via the bearings. Consequently, compared to when the two linear motion guides are used in the technology disclosed in Japanese Laid-open Patent Publication No. 2000-28846, the similar moving accuracy may be implemented at a lower cost by using the fusion splicer 1.

In addition, in the fusion splicer 1, the first eccentric cam unit 62ad and the first gear 62a are integrally formed of the same material, and the second eccentric cam unit 62bd and the second gear 62b are integrally formed of the same material. Consequently, it is possible to reduce the number of components and improve the assembly performance.

In addition, in the fusion splicer 1, the first gear 62a is rotatably supported by the first shaft 67a that is fixed to the first frame Fa supporting the first electric motor 61a, and the second gear 62b is supported by the second shaft 67b that is fixed to the second frame Fb supporting the second electric motor 61b. Consequently, it is possible to easily attach the gears to the shaft, thereby improving the assembly performance.

More specifically, during the assembly process of the fusion splicer 1, the position of the optical fiber core wires OF is adjusted by adjusting the abutting position of the first abutting surface 63aa and the bearing 70a, as well as the abutting position of the second abutting surface 64aa and the bearing 70b. However, it is also possible to adjust the above abutting positions, by adjusting the positions of the first frame Fa and the second frame Fb, by unitizing the components relating to the first frame Fa and the second frame Fb. In addition, during the assembly process of the fusion splicer 1, although the inside work space is very small, there is no need to perform adjustment in the small space of the fusion splicer 1, by assembling the relating components in advance and attaching the assembled and adjusted first frame Fa and second frame Fb to the components.

Furthermore, in the fusion splicer 1, the first arm unit 63b, the second arm unit 63c, and the third arm unit 64b each include the pair of arms 63ba and 63bb, the arms 63ca and 63cb, and the arms 64ba and 64bb that extend in parallel with one another. Consequently, it is possible to prevent the rotational deviations of the first rotating member 63 and the second rotating member 64, thereby enabling the first rotating member 63 and the second rotating member 64 to rotate highly accurately. In addition, a light receiving system may be arranged in space between the pair of arms. However, the present disclosure is not limited thereto, and at least one of the first arm unit, the second arm unit, and the third arm unit may be made of a single arm.

Furthermore, the fusion splicer 1 includes the speed reduction gears 65a and 65b. However, the first and second electric motors and the first and second gears may be meshed with each other directly, instead of using the speed reduction gears.

Furthermore, in the fusion splicer 1, the assembly of the first electric motor 61a, the speed reduction gear 65a, and the first gear 62a, and the assembly of the second electric motor 61b, the speed reduction gear 65b, and the second gear 62b are positioned at the same side relative to the first rotating member 63 and the second rotating member 64, in the Z-axis direction. However, the assemblies may be positioned opposite from each other interposing the first rotating member 63 and the second rotating member 64 therebetween.

Furthermore, in the fusion splicer 1, the first abutting surface 63aa and the second abutting surface 64aa have a substantially planar surface. However, the present disclosure is not limited thereto, and at least one of the first abutting surface and the second abutting surface may have a curved surface.

The present disclosure may advantageously implement a fusion splicer having high flexibility in designing.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fusion splicer for fusion-splicing tip ends of two optical fibers that are arranged facing each other, the fusion splicer comprising:
    a first rotating electric motor;
    a first gear that includes a first eccentric cam unit and rotates when driven to rotate by the first rotating electric motor;
    a first rotating member that includes:
        a first main body unit having a first abutting surface abutting on the first eccentric cam unit;
        a first arm unit that is provided so as to extend from the first main body unit and is rotatably supported by a main base of the fusion splicer, around an axis in parallel with a rotational axis of the first gear; and
        a second arm unit that is provided so as to extend from the first main body unit toward a direction different from that of the first arm unit;
    a second rotating electric motor;
    a second gear that includes a second eccentric cam unit and rotates when driven to rotate by the second rotating electric motor; and
    a second rotating member that includes:
        a second main body unit having a second abutting surface abutting on the second eccentric cam unit;
        a third arm unit that is provided so as to extend from the second main body unit and that is rotatably supported by the second arm unit around an axis in parallel with a rotational axis of the second gear as well as a rotational axis of the second arm unit;
        a fourth arm unit that is provided so as to extend from the second main body unit toward a direction different from that of the third arm unit; and
        a placing unit that is provided at a tip end of the fourth arm unit and on which a groove for receiving one of the optical fibers is formed.

2. The fusion splicer according to claim 1, wherein the first arm unit is supported by the main base via a bearing, and the third arm unit is supported by the second arm unit via a bearing.

3. The fusion splicer according to claim 1, wherein the first eccentric cam unit and the first gear are integrally formed of a same material, and the second eccentric cam unit and the second gear are integrally formed of a same material.

4. The fusion splicer according to claim 1, wherein
    the first gear is rotatably supported by a first shaft that is fixed to a first frame for supporting the first rotating electric motor, and
    the second gear is rotatably supported by a second shaft that is fixed to a second frame for supporting the second rotating electric motor.

5. The fusion splicer according to claim 1, wherein the first arm unit, the second arm unit, and the third arm unit each include a pair of arms that extend in parallel with each other.

* * * * *